(12) United States Patent
Bonanni et al.

(10) Patent No.: US 11,086,899 B2
(45) Date of Patent: Aug. 10, 2021

(54) ON DEMAND SYNCHRONIZATION OF INFORMATION

(71) Applicant: International Business Machines Corporation, Armonk, NY (US)

(72) Inventors: Cristina Bonanni, Rome (IT); Andrea Di Maio, Castellammare di Stabia (IT); Andrea Durastante, Rome (IT); Patrizia Manganelli, Rome (IT); Alessandro Stazi, Ardea (IT)

(73) Assignee: International Business Machines Corporation, Armonk, NY (US)

(*) Notice: Subject to any disclaimer, the term of this patent is extended or adjusted under 35 U.S.C. 154(b) by 278 days.

(21) Appl. No.: 16/295,310

(22) Filed: Mar. 7, 2019

(65) Prior Publication Data

US 2019/0205311 A1 Jul. 4, 2019

Related U.S. Application Data

(63) Continuation of application No. 15/230,614, filed on Aug. 8, 2016, now Pat. No. 10,262,052.

(51) Int. Cl.
| | |
|---|---|
| *G06F 16/27* | (2019.01) |
| *H04L 29/08* | (2006.01) |
| *G06F 16/93* | (2019.01) |
| *G06F 16/22* | (2019.01) |
| *G06F 16/23* | (2019.01) |

(52) U.S. Cl.
CPC .......... *G06F 16/27* (2019.01); *G06F 16/2228* (2019.01); *G06F 16/2379* (2019.01); *G06F 16/93* (2019.01); *H04L 67/1095* (2013.01)

(58) Field of Classification Search
CPC .. G06F 16/2379; G06F 16/2228; G06F 16/93; G06F 16/27; H04L 67/1095
See application file for complete search history.

(56) References Cited

U.S. PATENT DOCUMENTS

| | | | |
|---|---|---|---|
| 8,196,100 | B2 | 6/2012 | Petri |
| 8,205,151 | B2 | 6/2012 | Smith |
| 8,694,965 | B2 | 4/2014 | Eykholt |
| 9,086,944 | B2 | 7/2015 | Ientile et al. |
| 9,275,020 | B2 | 3/2016 | Horiuchi et al. |
| 9,436,454 | B1 | 9/2016 | Jain et al. |
| 10,262,052 | B2 * | 4/2019 | Bonanni ............. H04L 67/1095 |
| 2006/0136510 | A1 | 6/2006 | Voronov et al. |

(Continued)

OTHER PUBLICATIONS

Slusarz, Joanna; "Get Notified of Changes to Documents"; Laserfiche; Printed May 11, 2016; 7 pages.

(Continued)

*Primary Examiner* — Etienne P Leroux
(74) *Attorney, Agent, or Firm* — Edward J. Wixted, III (57) ABSTRACT

Embodiments of the present invention provide systems and methods for synchronizing document updates. An end-user subscribes to document updates of interest to the end-user. The contents associated with these updates are contained within one or more document sources, wherein the one or more document sources are used to construct an outputted document. Tags are utilized to monitor these updates and a fragmentation is performed in order to incorporate the modified content, associated with the updates, into a new outputted document.

20 Claims, 6 Drawing Sheets

(56) References Cited

U.S. PATENT DOCUMENTS

| | | |
|---|---|---|
| 2010/0005102 A1 | 1/2010 | Stefani |
| 2011/0161425 A1 | 6/2011 | Xiao et al. |
| 2012/0317110 A1* | 12/2012 | Butterfield ............ G06F 40/166 |
| | | 707/734 |
| 2014/0129661 A1* | 5/2014 | Thyagaraja ............. H04L 51/24 |
| | | 709/207 |
| 2016/0217218 A1* | 7/2016 | Hong ..................... G06Q 10/06 |

OTHER PUBLICATIONS

Bonazzoli et al.; U.S. Appl. No. 14/884,810; Entitled "Managing Changes to a Document in a Revision Control System"; filed Oct. 16, 2015.

Bonnani et al., U.S. Appl. No. 15/230,614; Entitled "On Demand Synchronization of Information"; filed Aug. 8, 2016.

* cited by examiner

ON DEMAND SYNCHRONIZATION OF INFORMATION

BACKGROUND OF THE INVENTION

The present invention relates generally to the field of information management, and more specifically to synchronizing document updates.

During the product development process and at stages when a product is commercially available to consumers, technical documents (such as product manuals) are created. Product manuals for commercially available products may be continuously updated. These original technical documents (i.e., the master documents) are used as a base to create additional kinds of modified deliverables (i.e., the outputted documents) such as a product customer presentation, a speech of a video, the skeleton of a scenario, educational documents, or a reference document for closing customer deals.

SUMMARY

According to one embodiment of the present invention, a method for synchronizing document updates is provided, comprising: subscribing, by one or more processors, to one or more updates, wherein the one or more updates are indicative of a plurality of document sources, wherein the subscribed one or more updates comprise a content of interest to an end-user; determining, by one or more processors, whether at least one modification is present within the plurality of document sources; and responsive to determining that at least one modification is present within the plurality of document sources, sending, by one or more processors, modified content from the plurality of document sources to a client device of the end-user.

Another embodiment of the present invention provides a computer program product for synchronizing document updates, based on the method described above.

Another embodiment of the present invention provides a computer system for synchronizing document updates, based on the method described above.

DETAILED DESCRIPTION

Users of a master document are often interested in identifying the modifications to some specific sections and have these modifications replicated and reflected in the outputted document. For example, for a computer salesperson, the software and hardware prerequisites or the product limitations of computer products are essential to create a contract of sale. Adding an operating system to the existing list of computer products within a product catalog may help in the sale of the product. In another example, additional side effects have been discovered in a medication, which has been on the market for many years. The immediate notification, to the consumer subscribed to the contraindications about these side effects, may warn consumers about the potential dangers of the medication. The immediacy and specificity of the information becomes a key factor in the development of documentation. In accordance with embodiments of the disclosed invention, the disclosed methods and systems permit a subset of updates to the master document to be sent out to a specific number of people and the subset of updates are incorporated into the outputted document. Thus, the people receiving the subset of updates are able to: determine exactly what content has been modified; compare the current content with the information in the outputted document; and save time in updating newly outputted documents.

Figure 1:
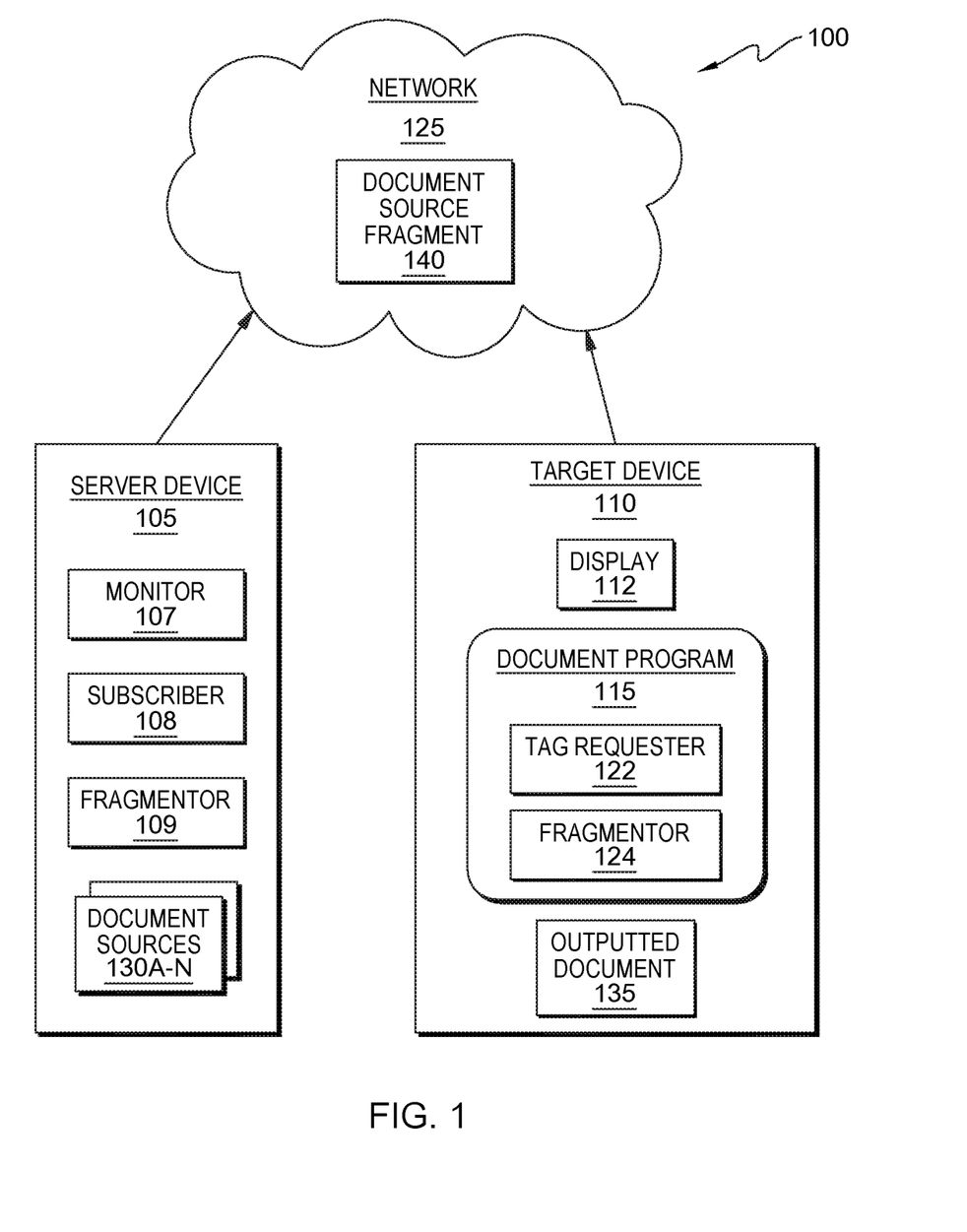
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of implementation and does not imply any limitations with regard to the environments in which different embodiments may be implemented. Modifications to data processing environment 100 may be made by those skilled in the art without departing from the scope of the invention as recited by the claims. In this exemplary embodiment, data processing environment 100 includes server device 105 and target device 110, interconnected via network 125.

Network 125 can be, for example, a local area network (LAN), a wide area network (WAN) such as the Internet, or a combination of the two, and can include wired, wireless, or fiber optic connections. In general, network 125 can be any combination of connections and protocols that will support communication between server device 105 and target device 110.

In an exemplary embodiment, document sources 130A-N are data sources for outputted documents from the target device. Document sources 130A-N are master documents residing on server device 105. N may equal 2 or a higher number which corresponds to the number of document sources which reside on server device 105. Document sources 130A-N and outputted document 135 are partially in sync with server device 105 and target device 110. Fragments of document sources 130A-N are pieces within document sources identified by a tag. When constructing outputted document 135, fragments of document sources 130A-N can reside on server device 105 and on the target device 110. In some embodiments, document sources 130A-N are created using a markup language such as DITA or DocBook. Outputted document 135 may be in a format different from document sources 130A-N. For example, one of these final formats is "html" which is ubiquitously displayed on the World Wide Web. A conversion tool applies this format to the fragments of document sources 130A-N before including these fragments in the outputted document 135. Document sources 130A-N are the master documents used to construct outputted document 135. The original version of outputted document 135 contains references to the master document(s) prior to receiving any updates. Target device 110 receives updates on the contents of interests within document sources 130A-N. Based on these received updates within document sources 130A-N, document program 115 within target device 110 generates a re-built version of outputted document 135 which incorporates the updated content from the received updates. This updated content is contained within document source fragment 140.

Server device 105 contains three main components and resident document sources 130A-N. These main components are: (i) monitor 107; (ii) subscriber 108; and (iii) fragmentor 109. Server device 105 is integrated with: the processes which manage the modifications of the master document created within the source code of the master document; and processes which are controlled by document program 115 (which resides only on target device 110). Monitor 107 intercepts modified tags and stores only those tags to which end-users (of target device 110) are subscribed to. Responsive to the content of tag becoming modified, the identifier of the tag is subsequently modified. The tag is composed of a prefix plus a numeric variable part. For example, if "ID1" is the initial identifier of the tag and the tag content is modified, the identifier is updated to "ID1_Ver1" and so on. Fragmentor 109 performs a split on the master document into a main document and on fragments enclosed by the subscribed tag. The link between the main document and the fragment is still the master document. Subscriber 108 associates an identifier tag with a user name. In other embodiments, the identifier tag is associated with an account name, phone number, or an e-mail address instead of the user name. Furthermore, subscriber 108 processes grains of information of interest to an end-user. The updates of interest to the end-user become document source fragment 140.

Target device 110 includes display 112 and document program 115. An end-user is using target device 110 in order to view the original version of and an updated version of outputted document 135. Target device 110 may include internal and external hardware components, as depicted and described in further detail with respect to FIG. 6.

Display 112 is a monitor display through which the end-user of target device 110 may view outputted document 135 (and even document sources 130A-N). Display 112 has user interface capability, wherein a graphical user interface (GUI) or a web user interface (WUI), displays text, documents, web browser windows, user options, application interfaces, and instructions for operation, and includes the information (such as graphics, text, and sound) a program presents to the end-user of target device 110 and the control sequences the end-user employs to control the program.

Document source fragment 140 resides in network 125. In some embodiments, there are multiple units of document source fragment 140. Document source fragment 140 is enclosed by subscribed tags. The subscribed tags are associated with updates to the contents of document sources 130A-N. Document sources 130A-N are components to construct the master document. For example, if there are three sets of grains of information—A, B, and C—dispersed within document sources 130A-N and the end-user is interested in only B, subscriber 108 is only concerned with updates associated with B and ignores updates associated with A and C. On server device 105, responsive to the master document fragment changes within document sources 130A-N, document source fragment 140 is generated and eventually sent to target device 110 in order to replace the corresponding part within outputted document 135.

Document program 115 is an application and/or patch which is capable of communicating with the components of server device 105 and document sources 130A-N. Document program 115 may be a web application, an add-on to the browser, or an e-mail plugin. There are two main components within document program 115: tag requester 122 and fragmentor 124. Note: fragmentor 124 and fragmentor 109 are two different instances of the same program running on two different devices, wherein fragmentor 124 runs on target device 110 and fragmentor 109 runs on server device 105. By using tag requester 122, target device 110 is able to receive subscriptions to the updates of a tag with an identifier. This tag encloses the document source fragment that is a prerequisite to construct the outputted document. The request to receive subscriptions to the updates are based on the end-user's interests, wherein the updates are sent to server device 105. The contents of interest to the end-user within document sources 130A-N are examined to determine if there are modifications within the contents of interest. The updates are triggered upon detecting modifications in the content of interest within document sources 130A-N. Fragmentor 124 performs fragmentation on the local version of the master document into a main document. The resulting fragments are enclosed by the subscribed tags. The link between the main document and the fragments is still the master document. Fragments are the only part of the master document which can change at the target device by creating a secondary document. The secondary document contains fragments which are associated with a subscribed tag. Document program 115 is applied as a solution to notify the end-user of target device 110 of any modification detected in at least part of document sources 130A-N. Subsequently, document program 115 processes the modified contents of document sources 130A-N on target device 110. A re-built version of outputted document 135 contains the modified contents. In an exemplary embodiment, document program 115 may be utilized during product development processes as there are multiple modifications to the documentation during these processes. An end-user needs to be aware of, and be notified of, only the modifications he or she needs to know of (i.e., the subscriptions to updates to contents of interest within document sources 130A-N). The prerequisites for the implementation of the mechanism made operable by document program 115 are the markup language file format and the predefined identification for each tag of the master document. Responsive to applying document program 115 on document sources 130A-N, document program 115 reuses inherited tags within document sources 130A-N, without document program 115 altering the source code within document sources 130A-N. Such tags allow the management of certain parts of the source code, which are modified, to be incorporated into the re-built version of outputted document 135. By reusing inherited tags, document program 115 is able to index the inherited tags.

Not all of the modifications of the master document (from document sources 130A-N) are replicated to the re-built version of outputted document 135. Only the modifications on the sections of interest of the master document are replicated to the re-built version of the outputted document 135. In contrast to the prior art, if the master documents (from document sources 130A-N) are updated or revised, then the end-user can only see the modifications in the outputted document 135 by subscribing to the master document by receiving all of the modified parts.

Figure 2:
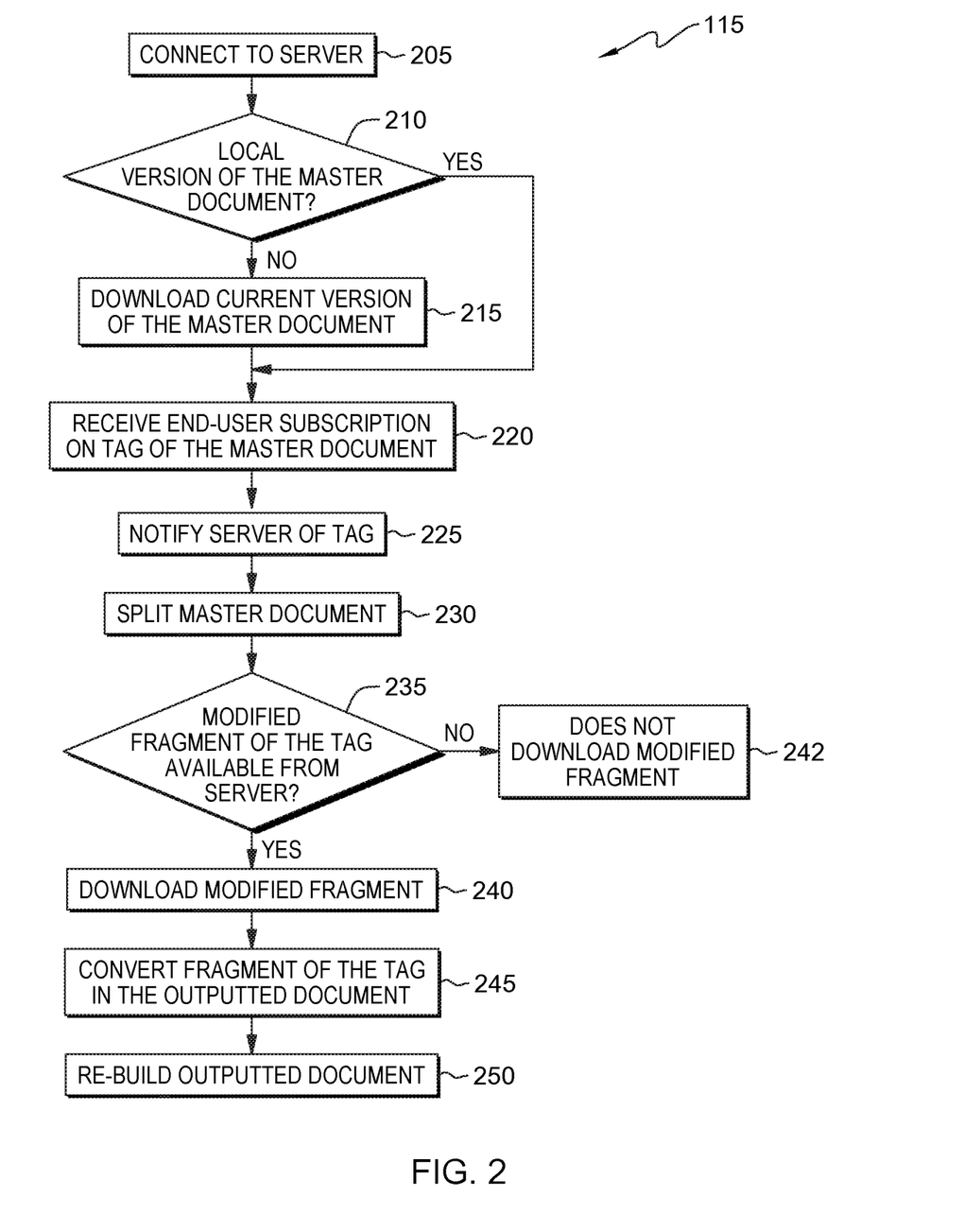
FIG. 2 is a flowchart depicting the operational steps for generating outputted documents and re-generating outputted documents based on at least one update, in accordance with an embodiment of the present invention.

FIG. 2 is a flowchart depicting the operational steps for generating outputted documents and re-generating outputted documents, based on at least one update, in accordance with an embodiment of the present invention.

In step 205, document program 115 connects to a server. The server is reminiscent of server device 105 (as described above). Document program 115 is integrated with server device 105 in order to: manage the modifications in a master document and convert the master document into the outputted documents (e.g., outputted document 135). In an exemplary embodiment, the master document is a type of data represented within document sources 130A-N, wherein portions of the master document are of interest to an end-user and the subscriptions to updates are associated with these portions. Server device 105 is configured to manage: (i) the notifications regarding document sources 130A-N which are used to generate an outputted document; (ii) the identifiers associated with tags of a source code; and (iii) the subscriptions. A master document is residing on server device 105 at this step.

In step 210, document program 115 determines if there is a local version of the master document. Document program 115 searches target device 110 for a local version.

In step 215, document program 115 downloads the current version of the master document upon document program 115 determining there is no local version of the master document. In other words, document program 115 is unable to find a local version of the master document on target device 110, and facilitates the downloading of the most current version of the master document onto target device 110.

In step 220, document program 115 receives an end-user subscription on a tag of the master document upon document program 115 determining there is a local version of the master document. The subscription is associated with the content of interest of the end-user within document sources 130A-N, wherein document sources 130A-N are components of the master document. The tags are used to encapsulate text and as a way to identify the updated content. At this stage, fragmentation on the master document is not performed in a manner which generates a fragment. Rather, contents of the master document are divided up into fragments.

In step 225, document program 115 notifies the server of the tag. Server device 105 examines the content associated with the tag for modifications of the contents. The modification is an update which leads to a new value being assigned to the identifier of the tag. Identifiers are associated with the tags of the source code within document sources 130A-N (such as paragraphs, lists, tables, images, notes, etc.) and on a mechanism which isolates the tag for which the update is required. This mechanism associates the tag identifier to a link with the same name and replaces all references to the identifier in the main module with the above link.

In step 230, document program 115 splits the master document. The splitting of the master document leads to a main document and a modified main document. The modified main document contains the fragments, wherein the fragments are associated with the divided up contents. The fragmentation process is based in part on the tag. As soon as the end-user subscribes to receive the updates on the content of a tag, document program 115 on target device 110 splits the original document into two documents: the main document and the modified document. At this point, an update has not been received, which is indicative of the fragment not becoming modified.

In step 235, document program 115 determines if the modified fragment of the tag is available from the server. In this exemplary embodiment, document program 115 must meet the trigger conditions of: (i) receiving modifications to the master document; and (ii) receiving the tags associated with the subscription to the updates. By meeting these two trigger conditions, the modified fragment of the tag is available from the server (i.e., the "Yes" branch). Furthermore, the server must contain the modified fragments, wherein the content of the tag is modified, in order for the flowchart to move along the "Yes" branch. If at least one of the trigger conditions is not met, the server does not contain the modified fragments (i.e., the "No" branch). For example, if there are modifications to the master document and the end-user does not have subscriptions to receive updates on the document modifications, then document program 115 does not download the modified fragment.

In step 240, document program 115 downloads the modified fragment upon document program 115 determining the modified fragment of the tag is available from the server. On the server, the fragments contain (i) document modifications; and (ii) subscriptions to updates associated with the tag. The downloaded modified fragment, which resides on the target device, is used to rebuild the outputted document.

In step 242, document program 115 does not download the modified fragment upon document program 115 determining the modified fragment of the tag is not available from the server. Document program 115 has determined on the server that there is: (i) no document modifications or no subscription to updates associated with a tag; or (ii) no document modifications and no subscription to updates associated with a tag.

In step 245, document program 115 converts the fragment of the tag in the outputted document. The downloaded fragment, which contains the modification, is sent to outputted document 135. The greater the number of source file sections subject to the subscription to updates, which are modified, the higher the number of fragments are converted. Thus, a process of granularity is commenced, depending exclusively on the demands of the end-users.

In step 250, document program 115 re-builds the outputted document. In order to complete the re-building step, document program 115 sends a request to server device 105, which stores the end-user's address and the relative tag identifier. When the content of the tag is modified, server device 105 runs the same type of fragmentation as performed by document program 115 on outputted document 135. The newly downloaded fragments are incorporated into the re-built version of outputted document 135. The newly downloaded fragment replaces any pre-existing fragment in target device 110. If there are not any subscriptions or modifications among the subscribed fragments, then outputted document 135 does not contain the modifications.

Figure 3:
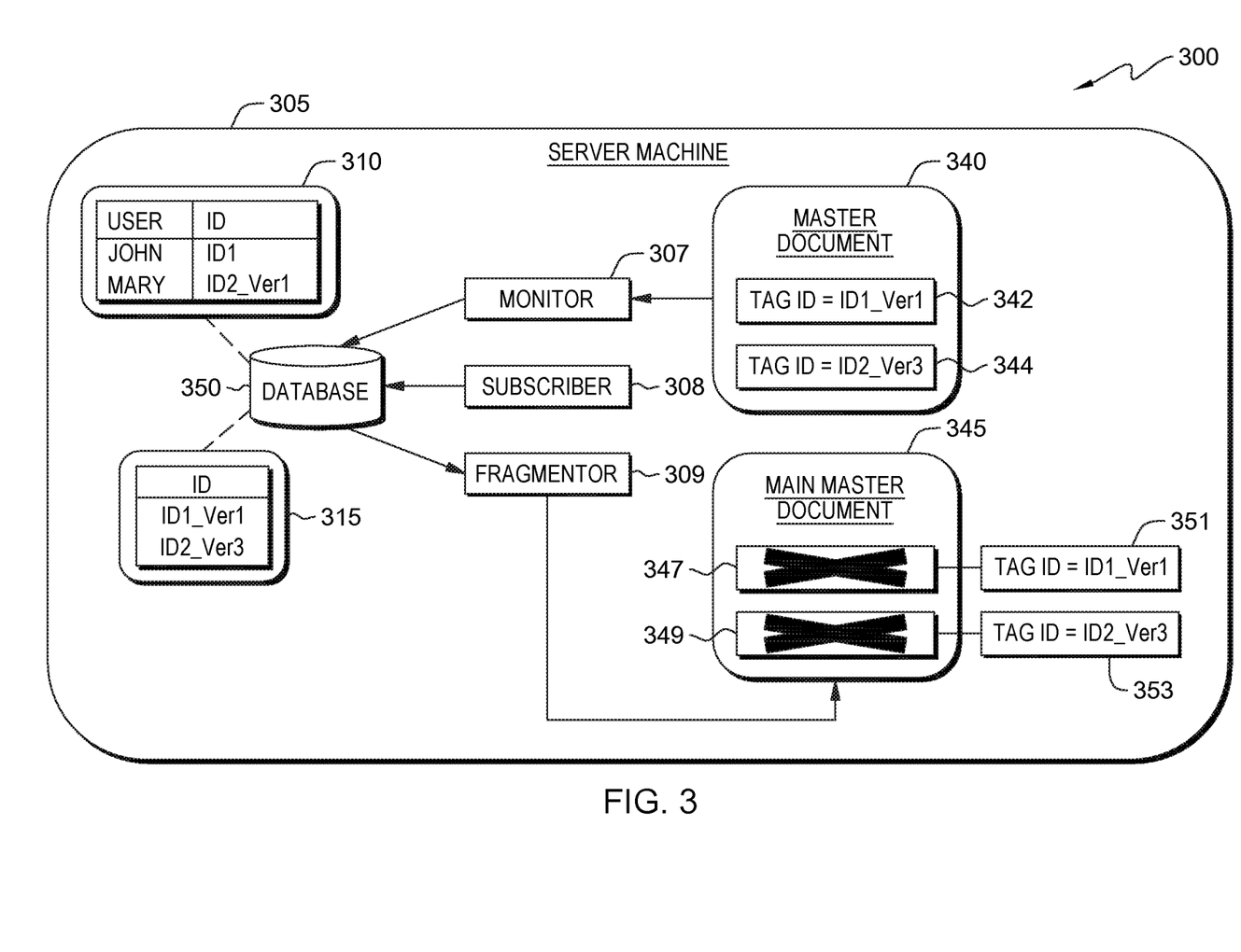
FIG. 3 is a block diagram depicting the flow of data performed by a server device, in accordance with an embodiment of the present invention.

FIG. 3 is a block diagram depicting the flow of data as performed by a server device, in accordance with an embodiment of the present invention.

Server device 305 consists of database 350 and three main components: monitor 307, subscriber 308, and fragmentor 309. Server device 105 is integrated with: the processes which manage the modifications of master document 340 created in the source code; and the process which converts master document 340 into updated main master document 345. Environment 300 is a data processing environment depicting a subscription table working in conjunction with a server device.

The processing of fragments and any updates to the contents of the fragments leads to master document 340 and main master document 345. Main master document 345 is modified in comparison to master document 340. Master document 340 is depicted as having entries of tag 342 and tag 344, wherein tag 342 is "TAG ID=ID1_Ver1"; and tag 344 is "TAG ID=ID2_Ver1". Updated main master document 345 is depicted as having modified contents in the form of content 347 and 349. Tag 351 is "TAG ID=ID1_Ver1" and is associated with content 347. Tag 353 is "TAG ID=ID2_Ver3" and is associated with content 349.

Monitor 307 receives the modified subscribed tags from master document 340. Master document 340 contains tag 342 and tag 344, wherein the modified subscribed tags are stored in latest tag table 315. The modified version of master document 340 is main master document 345, wherein the main master document 345 contains the same tags (with the accompanying identifier) as the tags (with the accompanying identifier) within latest tag table 315.

Database 350 stores subscribed tags to which some users are subscribed to. The subscribed tags are stored in subscribed tag table 310. Upon the detection of modifications (i.e., an update) in subscribed tags, the modified versions of the subscribed tags are stored in latest tag table 315. The identifier of the tag is modified when the tag content is modified. The identifier is composed of a prefix plus a numeric variable part. For example, "ID1" is the initial identification of the tag. In this exemplary embodiment, the modifications in the tag content lead to the identifier getting updated to "ID1_Ver1" and so on.

Subscriber 308 receives the identifier of tags associated with an end-user. Subscriber 308 sends information on the tags to subscribed tag table 310 and latest tag table 315. End-users subscribe to updates associated with content of interest within document sources 130A-N. The updates are given a tag, wherein the tag is given an identifier. In subscribed tag table 310, the tags are given the identifiers of "ID1" and "ID2" which correspond to user John and Mary, respectively. John is only interested in ID1 whereas Mary is only interested in ID2. In latest tag table 315, the most recent version of the subscriber tag is stored. The most recent version contains the tags with the identifiers of "ID1_ver1" and "ID2_ver3".

Fragmentor 309 performs fragmentation on the modified tag with a subscription upon determining the content of the subscriber tag has been modified (see step 235 in FIG. 2). The modification of the content of the subscriber tag corresponds to the updates in document sources 130A-N. The latest version of the modified subscriber tags resides in latest tag table 315. By sending the fragments which contain modified content in latest tag table 315, the fragmenting of master document 340 leads to main master document 345. The contents of tag 351 and tag 353 are the resulting data from performing fragmentation, wherein the identification of the tags in latest tag table 315 is the same as the identification of the tag 351 and tag 353. The most updated/latest version of the modified content in main master document 345 contains "ver1" of "ID1" and "ver3" for "ID2."

Figure 4:
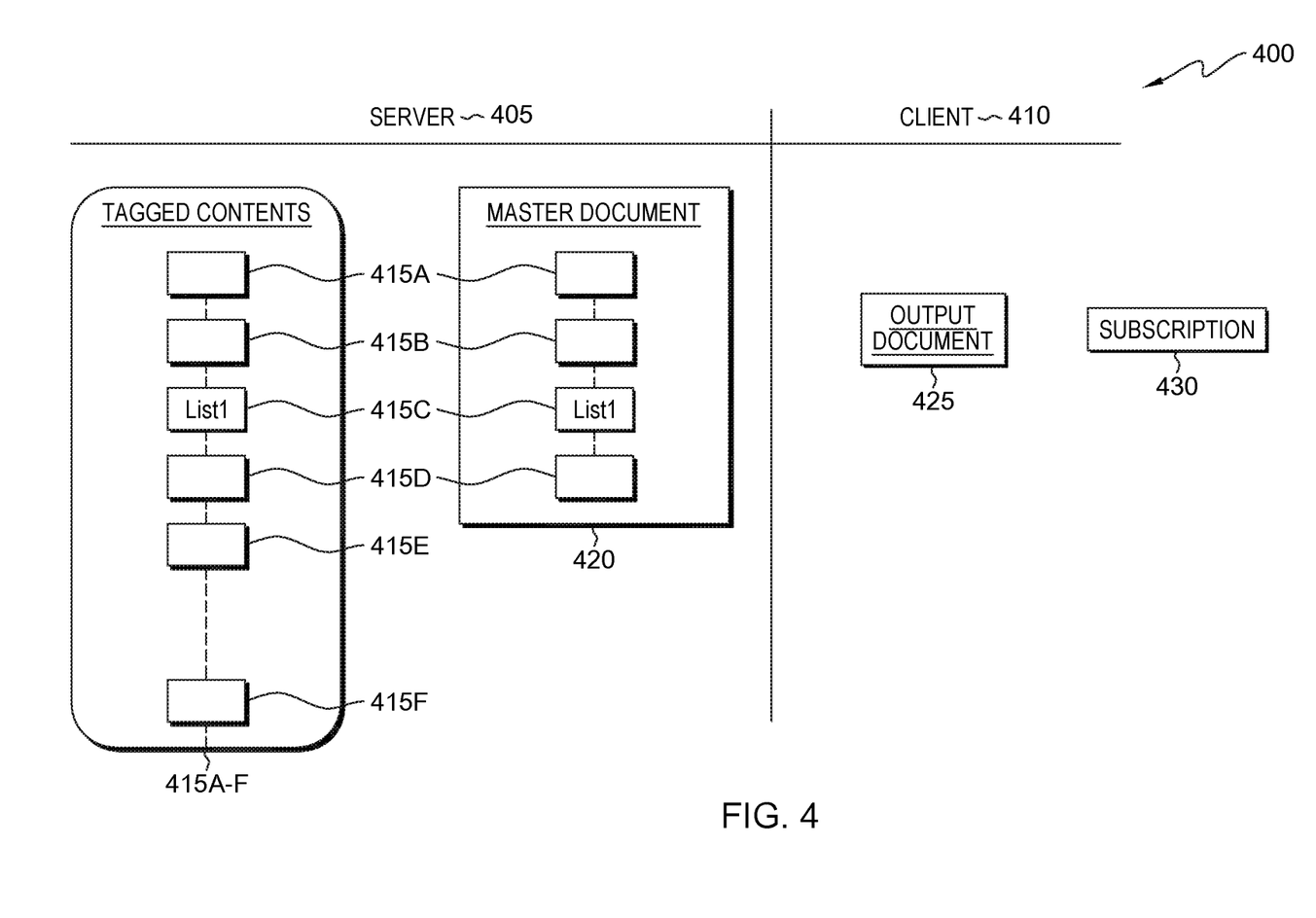
FIG. 4 is a block diagram depicting the components involved in the creation of an outputted document, in accordance with an embodiment of the present invention.

FIG. 4 is a block diagram depicting the components involved in the creation of an outputted document, in accordance with an embodiment of the present invention. Environment 400 is a data processing environment where a client device works in conjunction with tagged topics on a server device. The server device is server 405 and the client device is client 410.

Output document 425 is constructed from tagged contents 415A, 415B, 415C, and 415D. On server 405, there is a set of tagged contents 415A-F. Tagged contents 415E and 415F are not used to construct master document 420. Tagged content 415C is an example of a subscription, by an end-user, to updates for the tag with identifier "LIST1", wherein "LIST1" lists prerequisites for output document 425.

Client 410 receives a copy of output document 425. Typically, document program 115 is used to facilitate the downloading of the modified content of master document 420 locally on client 410. Output document 425 is a version of master document 420 which is outputted to the end-user of client 410.

Subscription 430 stores the content of the future updates for "LIST1", wherein the content is the identifiers of the tags. More specifically, tag requester 122 (of document program 115) allows an end-user to subscribe to the tagged topic—"LIST1"—for future updates.

Figure 5:
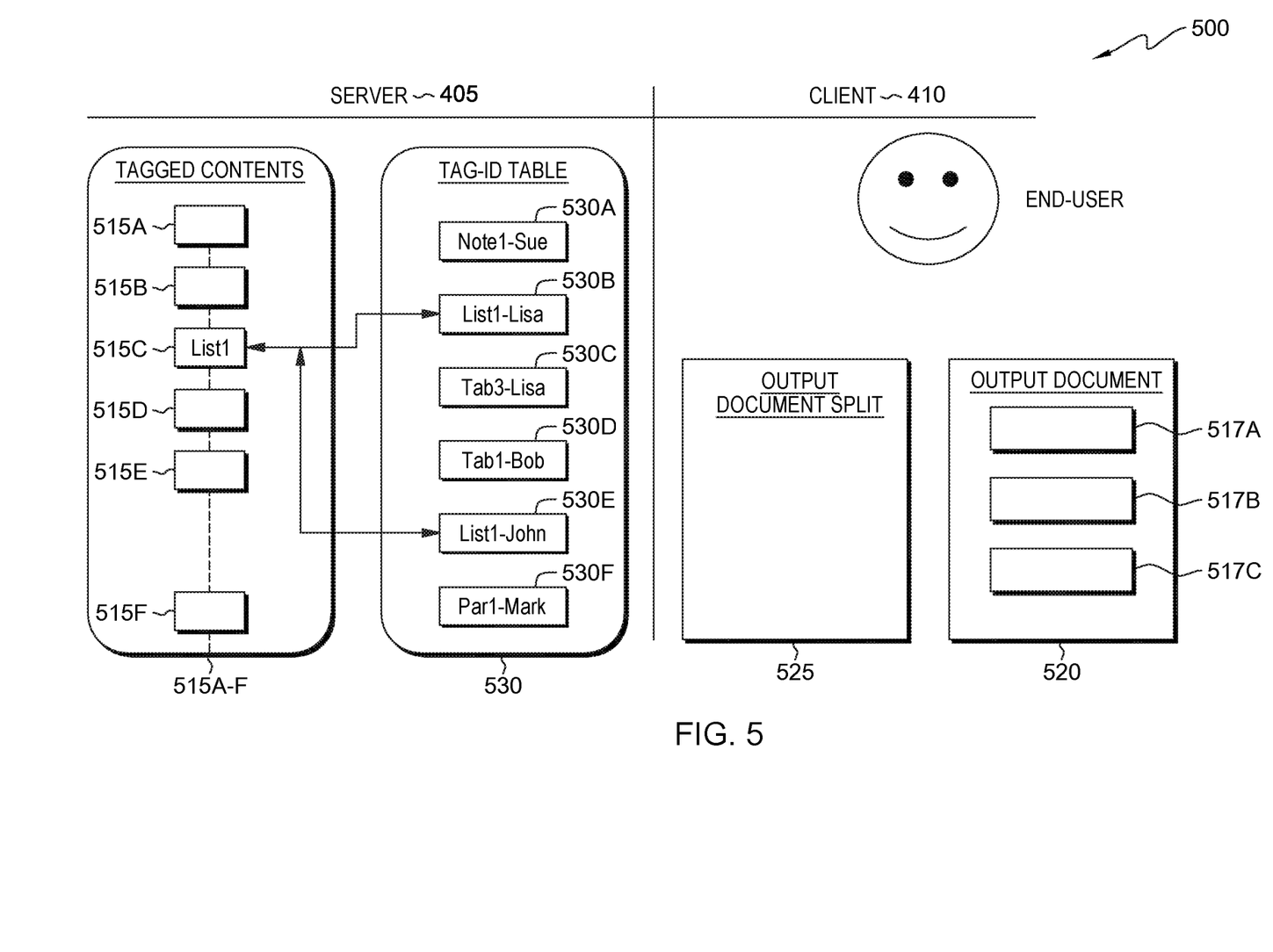
FIG. 5 is a block diagram depicting the components involved in the creation of an outputted document split and a notification list, in accordance with an embodiment of the present invention.

FIG. 5 is a block diagram depicting the components involved in the creation of an outputted document split and a notification list, in accordance with an embodiment of the present invention. Environment 500 is a data processing environment where a client device works in conjunction with tagged topics and notifications on a server device. The server device is server 505 and the client device is client 510.

Output document 520 is split by fragmentor 124 (of document program 115) in order to furnish output document split 525. In client 510, output document 520 is constructed of portions 517A, 517B, and 517C. The fragmentation is not performed on output document 520 but on a locally residing version of the master document within client 510.

Tag-ID table 530 is created, wherein each entry of tag-ID table 530 corresponds to the name of an end-user to an identifier of a tag. Tag-ID table 530 contains entries 530A, 530B, 530C, 530D, 530E, and 530F with the corresponding identifier tag-name of the end-user combinations of: "Note1-Sue"; "List1-Lisa"; "Tab3-Lisa"; "Tab1-Bob"; "List1-John"; and "Par1-Mark", respectively. On server 505, tagged content 515C, among tagged contents 515A-F, contains the identifier tag "List1". The tagged content may be of interest to more than one subscriber. The subscriber component (i.e., subscriber 108) associates identifier tag "List1" in tagged content 515C with the user John (from entry 530E). Entry 530B, which contains the identifier tag "List1", is also associated with tagged content 515C. In contrast to entry 530E, the subscriber component associates the identifier tag "List1" with the user Lisa in entry 530C.

Figure 6:
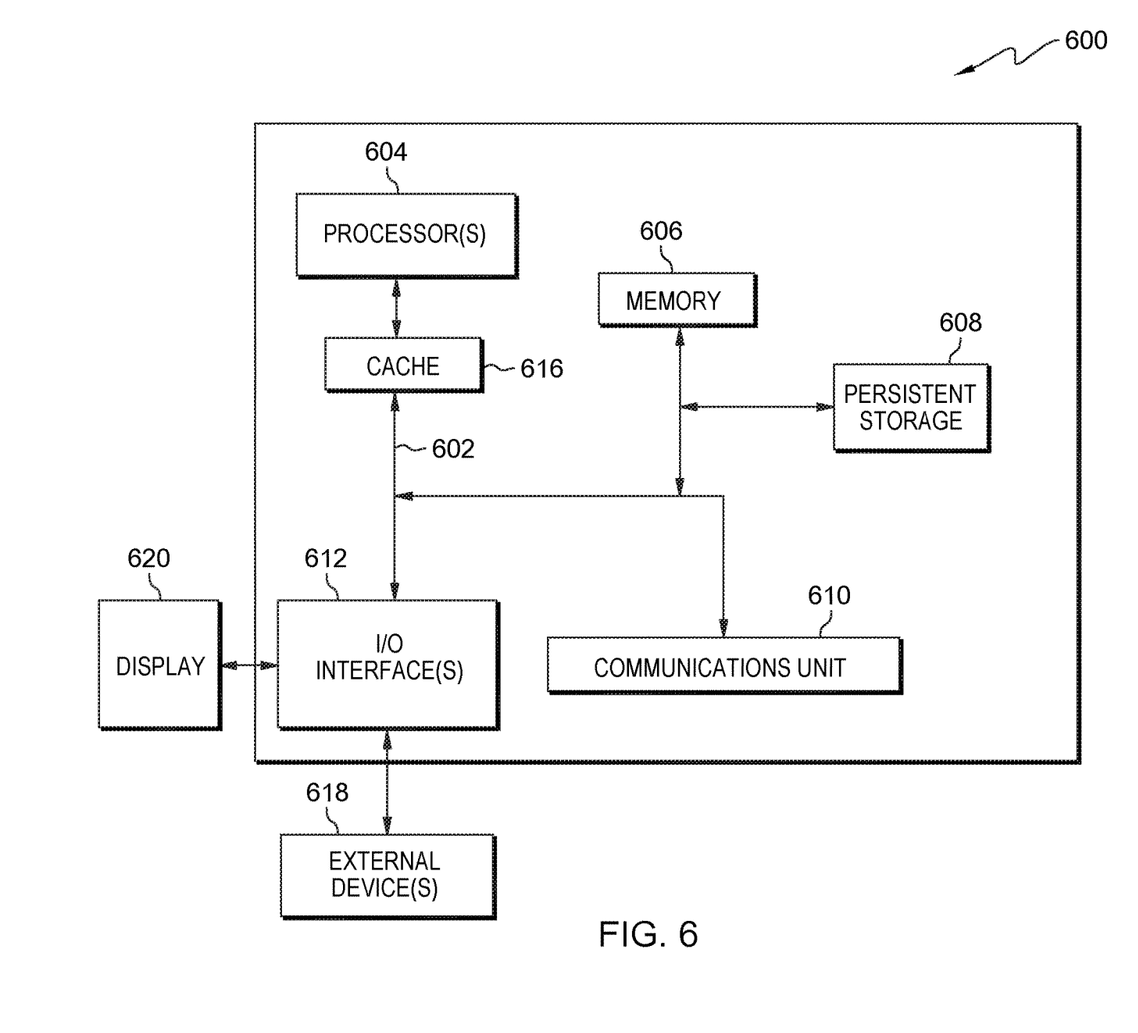
FIG. 6 depicts a block diagram of internal and external components of a computing device, in accordance with an embodiment of the present invention.

FIG. 6 depicts a block diagram of internal and external components of computer system 600, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Computer system 600 includes communications fabric 602, which provides for communications between one or more processors 604, memory 606, persistent storage 608, communications unit 610, and one or more input/output (I/O) interfaces 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media. Software (e.g., modeling program, travel optimization program, etc.) is stored in persistent storage 608 for execution and/or access by one or more of the respective processors 604 via one or more memories of memory 606.

Persistent storage 608 may include, for example, a plurality of magnetic hard disk drives. Alternatively, or in addition to magnetic hard disk drives, persistent storage 608 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 608 can also be removable. For example, a removable hard drive can be used for persistent storage 608. Other examples include optical and magnetic disks, thumb drives, and smart cards that are inserted into a drive for transfer onto another computer-readable storage medium that is also part of persistent storage 608.

Communications unit 610 provides for communications with other computer systems or devices via a network. In this exemplary embodiment, communications unit 610 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to a computing device through communications unit 610 (e.g., via the Internet, a local area network or other wide area network). From communications unit 610, the software and data can be loaded onto persistent storage 608.

One or more I/O interfaces 612 allow for input and output of data with other devices that may be connected to computer system 600. For example, I/O interface 612 can provide a connection to one or more external devices 618 such as a keyboard, computer mouse, touch screen, virtual keyboard, touch pad, pointing device, or other human interface devices. External devices 618 can also include portable computer-readable storage media such as, for example, thumb drives, portable optical or magnetic disks, and memory cards. I/O interface 612 also connects to display 620.

Display 620 provides a mechanism to display data to a user and can be, for example, a computer monitor. Display 620 can also be an incorporated display and may function as a touch screen, such as a built-in display of a tablet computer.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for synchronizing document updates, the method comprising the steps of:
    subscribing, by one or more processors, to one or more updates, wherein the one or more updates are indicative of a plurality of document sources, wherein the subscribed one or more updates comprise a content of interest to an end-user;
    determining, by one or more processors, whether at least one modification is present within the plurality of document sources;
    responsive to determining that at least one modification is present within the plurality of document sources, sending, by one or more processors, modified content from the plurality of document sources, to a client device of the end-user; and
    performing, by one or more processors, a first split of a first outputted document by generating a first module and a second module, wherein the first module contains modified content of the first outputted document and the second module contains original content of the first outputted document.

2. The method of claim 1, wherein subscribing to the one or more updates, comprises:
    utilizing, by one or more processors, one or more tags, wherein each of the one or more tags corresponds to a single update, and wherein the one or more tags are characterized using a first identifier; and
    responsive to determining that there is a modification to the one or more tags, characterizing, by one or more processors, the one or more tags, using a second identifier.

3. The method of claim 2, further comprises:
    responsive to determining that there are modifications to the one or more tags, instructing, by one or more processors, a server device to:
        store content associated with the one or more subscribed updates;
        associate the one or more subscribed updates with at least one or more end-users; and
        perform a first fragmentation of a temporary document, wherein the temporary document contains the one or more subscribed updates.

4. The method of claim 2, further comprises:
    responsive to the modification of contents of the one or more tags, instructing, by one or more processors, a server device to perform a second split in order to:
        capture the modified contents of the one or more tags within the second module;
        send the second module to the client device; and
        incorporate the modified contents of the one or more tags into the second module in order to construct a second outputted document; and
    replacing, by one or more processors, the first module with the second module.

5. The method of claim 2, further comprises:
    indexing, by one or more processors, a source code of the plurality of document sources, by storing and grouping the one or more tags.

6. The method of claim 1, further comprises:
    enabling, by one or more processors, the end-user of the client device to subscribe to the one or more update.

7. The method of claim 1, wherein sending the modified content to the client device, further comprises:
    re-building, by one or more processors, the first outputted document as a second outputted document, wherein the second outputted document contains at least one modification of content within the plurality of document sources.

8. A computer program product for synchronizing document updates, the computer program product comprising:
    a computer readable storage medium and program instructions stored on the computer readable storage medium, the program instructions comprising:
        program instructions to subscribe to one or more updates, wherein the one or more updates are indicative of a plurality of document sources, wherein the subscribed one or more updates comprise a content of interest to an end-user;
        program instructions to determine whether at least one modification is present within the plurality of document sources;
        responsive to determining that at least one modification is present within the plurality of document sources, program instructions to send modified content from the plurality of document sources, to a client device of the end-user; and program instructions to perform a first split of a first outputted document by generating a first module and a second module, wherein the first module contains modified content of the first outputted document and the second module contains original content of the first outputted document.

9. The computer program product of claim 8, wherein program instructions to subscribe to the one or more updates, comprise:

program instructions to utilize one or more tags, wherein each of the one or more tags corresponds to a single update, and wherein the one or more tags are characterized using a first identifier; and responsive to determining that there is a modification to the one or more tags, program instructions to characterize the one or more tags, using a second identifier.

10. The computer program product of claim 9, further comprises:

responsive to determining that there are modifications to the one or more tags, program instructions to instruct a server device to:

store content associated with the one or more subscribed updates;

associate the one or more subscribed updates with at least one or more end-users; and perform a first fragmentation of a temporary document, wherein the temporary document contains the one or more subscribed updates.

11. The computer program product of claim 9, further comprises:

responsive to the modification of contents of the one or more tags, program instructions to instruct a server device to perform a second split in order to:

capture the modified contents of the one or more tags within the second module;

send the second module to the client device; and incorporate the modified contents of the one or more tags into the second module in order to construct a second outputted document; and program instructions to replace the first module with the second module.

12. The computer program product of claim 9, further comprises:

program instructions to index a source code of the plurality of document sources, by storing and grouping the one or more tags.

13. The computer program product of claim 8, further comprises:

program instructions to enable the end-user of the client device to subscribe to the one or more updates.

14. The computer program product of claim 8, wherein program instructions to send the modified content to the client device, further comprise:

program instructions to re-build the first outputted document as a second outputted document, wherein the second outputted document contains at least one modification of content within the plurality of document sources.

15. A computer system for synchronizing document updates, the computer system comprising:

one or more computer processors;

one or more computer readable storage media; and program instructions stored on the one or more computer readable storage media for execution by at least one of the one or more processors, the program instructions comprising:

program instructions to subscribe to one or more updates, wherein the one or more updates are indicative of a plurality of document sources, wherein the subscribed one or more updates comprise a content of interest to an end-user;

program instructions to determine whether at least one modification is present within the plurality of document sources;

responsive to determining that at least one modification is present within the plurality of document sources, program instructions to send modified content from the plurality of document sources, to a client device of the end-user; and program instructions to perform a first split of a first outputted document by generating a first module and a second module, wherein the first module contains modified content of the first outputted document and the second module contains original content of the first outputted document.

16. The computer system of claim 15, wherein program instructions to subscribe to the one or more updates, comprise:

program instructions to utilize one or more tags, wherein each of the one or more tags corresponds to a single update, and wherein the one or more tags are characterized using a first identifier; and responsive to determining that there is a modification to the one or more tags, program instructions to characterize the one or more tags, using a second identifier.

17. The computer system of claim 16, further comprises:

responsive to determining that there are modifications to the one or more tags, program instructions to instruct a server device to:

store content associated with the one or more subscribed updates;

associate the one or more subscribed updates with at least one or more end-users; and perform a first fragmentation of a temporary document, wherein the temporary document contains the one or more subscribed updates.

18. The computer system of claim 16, further comprises:

responsive to the modification of contents of the one or more tags, program instructions to instruct a server device to perform a second split in order to:

capture the modified contents of the one or more tags within the second module;

send the second module to the client device; and incorporate the modified contents of the one or more tags into the second module in order to construct a second outputted document; and program instructions to replace the first module with the second module.

19. The computer system of claim 15, further comprises:

program instructions to enable the end-user of the client device to subscribe to the one or more updates.

20. The computer system of claim 15, wherein program instructions to send the modified content to the client device, further comprise:

program instructions to re-build the first outputted document as a second outputted document, wherein the second outputted document contains at least one modification of content within the plurality of document sources.

* * * * *